United States Patent [19]

Morud

[11] Patent Number: 4,656,414
[45] Date of Patent: Apr. 7, 1987

[54] EFFICIENT SWITCH DRIVE CIRCUIT
[75] Inventor: Jeffery L. Morud, Mesa, Ariz.
[73] Assignee: Motorola, Inc., Schaumburg, Ill.
[21] Appl. No.: 789,198
[22] Filed: Oct. 18, 1985
[51] Int. Cl.$^4$ ............................................... G05F 1/46
[52] U.S. Cl. .................................. 323/289; 307/270; 363/97
[58] Field of Search ............... 323/222, 282, 284, 288, 323/289, 290, 901; 307/270, 280, 300; 363/20–21, 97

[56] References Cited

U.S. PATENT DOCUMENTS

| | | | |
|---|---|---|---|
| 3,838,329 | 9/1974 | Michelet et al. | 323/289 X |
| 3,999,086 | 12/1976 | Ekelund | 323/289 X |
| 4,220,987 | 9/1980 | Rao et al. | 323/289 X |
| 4,302,807 | 11/1981 | Mentler | 363/134 |
| 4,420,804 | 12/1983 | Nishino | 363/21 |
| 4,430,608 | 2/1984 | Nesler | 323/282 |

OTHER PUBLICATIONS

R. Hammond et al., "High Power Vector Summation Switching Power Amplifier Development", PESC '81, IEEE, Boulder, Co., USA. (29 Jun.–3 Jul. 1981), pp. 267–272.

Primary Examiner—Peter S. Wong
Attorney, Agent, or Firm—Lowell W. Gresham

[57] ABSTRACT

A circuit which drives a control node of a switching device, such as a base node of an output transistor in a switching power supply, is disclosed. A pulsewidth modulator provides an activating peak current pulse to the control node, but the peak current pulse is later removed to reduce power dissipation. Inductively coupled power sources provide steady state drive current and a negative potential which is applied to the control node the instant the switching device inactivates.

14 Claims, 3 Drawing Figures

EFFICIENT SWITCH DRIVE CIRCUIT

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates generally to switching power supplies which use a semiconductor device, such as a transistor, to selectively permit current flow through an inductor. Specifically, this invention relates to circuits which drive a control node, such as a base node of the transistor, in response to a pulsewidth modulated control signal.

Semiconductor devices used in switching power supplies operate in a precisely controlled manner to insure efficient and reliable operation of the semiconductor devices. For example, efficient and reliable operation of a switching transistor requires driving a base node of the transistor so that three goals are achieved. For the first goal, a relatively high, peak current pulse is supplied to the transistor base at the instant the transistor activates. This activating peak current pulse permits the transistor to experience a relatively fast activation time. As a result, the transistor quickly achieves a saturation state and dissipates a relatively small amount of power in the process of transitioning from an inactivated to an activated state.

A second goal concerns providing only sufficient steady state current to the transistor base to keep the transistor in saturation. This steady state base current should be less than the activating peak current pulse and should not increase to a destructive value even under worst case conditions.

The third goal concerns inactivating the transistor. Accordingly, a base-emitter voltage of the transistor must reverse polarity so that the transistor will experience a relatively fast inactivation time. The fast inactivation time permits the transistor to transition between an active state and an inactive state rapidly and without dissipating a great amount of power.

By achieving the three above-mentioned goals, a switching transistor may operate in a relatively efficient manner. The switching device may also operate in a relatively reliable manner because it dissipates a minimal amount of power. Although circuits which achieve one or more of the above goals are known in the art, such circuits tend to ignore the efficient and reliable operation of the circuit which causes the switching device to achieve these three goals. For example, many of these circuits drive a transistor base node from a high voltage source. Although a high voltage source may be needed to achieve the activating peak current pulse, it is typically not needed to supply the steady state current. Accordingly, the steady state current experiences a relatively high voltage drop, and causes relatively great power consumption.

Some devices directly couple the base drive circuit to an unregulated line voltage. The unregulated line voltage exhibits relatively unpredictable characteristics. Thus, worst case base drive current is difficult to control, and a relatively unreliable circuit results. Other base drive circuits require additional regulated voltage sources for reliable operation. However, the additional regulated voltage sources increase complexity, lead to an increased power dissipation, and degrade overall reliability.

SUMMARY OF THE INVENTION

Accordingly, it is an object of the present invention to provide an improved control node driving circuit for a switching device which causes the switching device to experience relatively fast activation and inactivation times yet refrains from supplying an excessive amount of steady state current.

Another object of the present invention concerns providing an improved control node driving circuit which is efficient to operate.

Yet another object of the present invention concerns providing an improved control node switching circuit which is isolated from unregulated voltages.

The above and other objects and advantages of the present invention are carried out in one form by a control node driving circuit which receives a control signal and drives a control node of a switching device. The control signal exhibits an active state which commands activation of the switching device. Further, the control signal provides a current at a relatively high voltage when the control signal is active. An initiating means activates the switching device using the current capability of the control signal. A retarding means reduces current flow of the control signal through the control node of the switching device. A current source, independent from the control signal, provides current at a relatively low voltage, and a driving means couples the current source to the control node of the switching device so that the majority of steady state current to the switching device originates from the current source.

BRIEF DESCRIPTION OF THE DRAWINGS

A more complete understanding of the present invention may be derived by reference to the detailed description and the claims when considered in connection with the accompanying drawings in which like reference numbers indicate similar parts, and wherein:

DETAILED DESCRIPTION OF THE PREFERRED EMBODIMENT

Figure 1:
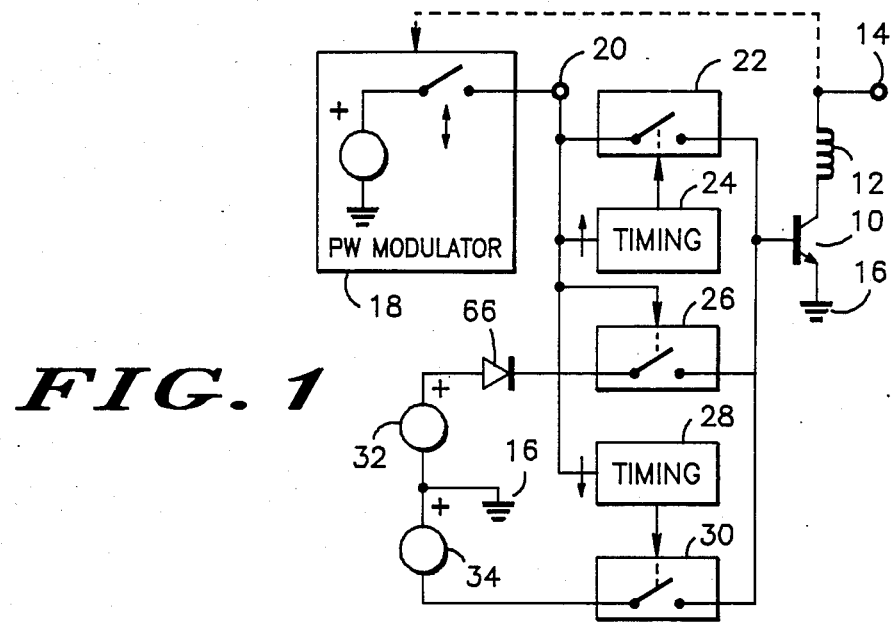
FIG. 1 shows a block diagram of the present invention.

FIG. 1 shows a block diagram which illustrates the basic operation of the present invention. In FIG. 1, a semiconductor output switching device 10, such as an NPN transistor, has a first signal node which couples to a terminal 16. Terminal 16 is adapted to receive a common potential, or ground. An inductor 12 couples in series between a second signal node of switching device 10 and a terminal 14. Inductor 12 represents a reactive energy storage device. Terminal 14 may couple to a line voltage and other circuits (not shown) which are conventional in switching power supplies.

A pulsewidth modulator 18 represents a conventional device known to those skilled in the art of designing switching power supplies and is not described in detail herein. Pulsewidth modulator 18 couples to terminal 14 and inductor 12 in a manner known to those skilled in the art so that feedback from operation of switching device 10 and inductor 12 controls operation of pulsewidth modulator 18. In this embodiment pulsewidth modulator 18, at an output thereof, provides a digital signal which exhibits a logical high voltage level to command the activation of switching device 10. This high voltage level represents the active state of a control signal provided by pulsewidth modulator 18. Pulsewidth modulator 18 maintains the active state of the control signal until it commands the inactivation of switching device 10. This inactivation command occurs in response to feedback provided to pulsewidth modulator 18. Further, the control signal exhibits a logical low voltage level to command the inactivation of switching device 10.

The output of pulsewidth modulator 18 connects to a terminal 20, a first signal node of a switch 22, an input of a timing section 24, a control input of a switch 26, and an input of a timing section 28. A second signal node of switch 22 connects to a control node of switching device 10. A base node of a bipolar transistor represents one form of such a control node. Likewise, second signal nodes of switches 26 and 30 connect together and to the control node of switching device 10. An output from timing section 24 connects to a control input of switch 22, and an output from timing section 28 connects to a control input of switch 30. A positive node of a power source 32 connects to an anode of a diode 66, and a cathode of diode 66 connects to a first signal node of switch 26. A negative node of a power source 34 connects to a first signal node of switch 30. Finally, a positive node of power source 34 connects to a negative node of power source 32, and to ground terminal 16.

Imediately prior to activation of the control signal output from pulsewidth modulator 18, switching device 10 exhibits the inactivated state. In other words, substantially no current flows through the signal nodes of switch 22, and substantially no current flows through the control node of switching device 10. However, at the instant the control signal activates, switch 22 closes as a result of the operation of timing section 24, and the control signal directly couples to the control node of switching device 10. Thus, at the instant the control signal activates, the control signal initiates the activation of switching device 10. Furthermore, the initial activation of switching device 10 utilizes current capabilities inherent in the control signal.

Pulsewidth modulator 18 provides the activated control signal at a relatively high voltage level, which may advantageously be at 8 to 9 volts above the common potential. The first signal node of switching device 10, such as an emitter of an NPN transistor, couples to ground terminal 16. Thus, current flows from pulsewidth modulator 18, through switch 22, and through switching device 10 to ground terminal 16. The current flow through switching device 10 causes switching device 10 to activate. Furthermore, in the present embodiment the current flow through switching device 10, at the instant switching device 10 activates, represents a relatively high amount of current.

Switching device 10 continues to operate with the relatively high current inherent in the control signal until timing section 24 opens switch 22. Timing section 24 responds to the beginning, or activation, of the control signal. Timing section 24 permits switch 22 to remain closed only for a predetermined amount of time after the activation of the control signal. This predetermined amount of time represents the amount of time that an activating peak current pulse is provided to the control node of switching device 10. Further, this predetermined amount of time expires prior to the inactivation of the control signal.

The positive node of power source 32 couples to the control node of switching device 10 whenever the control signal activates. The positive node of power source 32 remains coupled to the control node of switching device 10 so long as the control signal remains active, but disconnects from the control node of switching device 10 when the control signal inactivates. Thus, when current of the control signal through switch 22 no longer supplies switching device 10 due to the opening of switch 22, steady state current from power source 32 supplies current to switching device 10 through switch 26. This steady state current continues until the inactivation of the control signal. Further, this steady state current is supplied at a relatively low voltage, when compared to voltage of the control signal, to reduce power dissipation.

When the control signal inactivates, both switches 22 and 26 open. However, timing section 28 responds to the end, or inactivation, of the control signal and causes switch 30 to close. Thus, at the instant the control signal first inactivates, a negative potential from the negative node of power source 34 couples to the control node of switching device 10 through switch 30. Timing section 28 measures a predetermined delay after the inactivation of the control signal and then causes switch 30 to open. When switch 30 opens, the negative voltage from power source 34 is removed from the control terminal of switching device 10. The predetermined delay associated with timing section 28 is advantageously less than the amount of time between the inactivation of the control signal and a future activation of the control signal. Thus, the control node driving circuit of the present invention is prepared for another activation of switching device 10 by the control signal.

In summary, a relatively high initiating peak current pulse is supplied to the control node of switching device 10 by switching the control signal directly to the control node of switching device 10. At this point in time a relatively high power dissipation occurs because this activating peak current pulse experiences a relatively high voltage drop from the output of pulsewidth modulator 18 through switch 22 and switching device 10 to ground terminal 16. However, the peak current pulse is removed from the control node of switching device 10 while the control signal remains active. When the control signal is removed from the control node of switching device 10, a steady state current continues to supply switching device 10. However, this steady state current originates from power source 32 rather than pulsewidth modulator 18. Power source 32 represents a relatively low voltage source compared to the output of pulsewidth modulator 18. Since steady state current which supplies switching device 10 originates from a lower voltage source, it experiences a reduced power dissipation compared to the activating peak current pulse. The reduced power dissipation of the steady state current continues until inactivation of the control signal. When the control signal initially inactivates, a negative potential is applied to the control node of switching device 10, and switching device 10 experiences a fast inactivation time.

Figure 2:
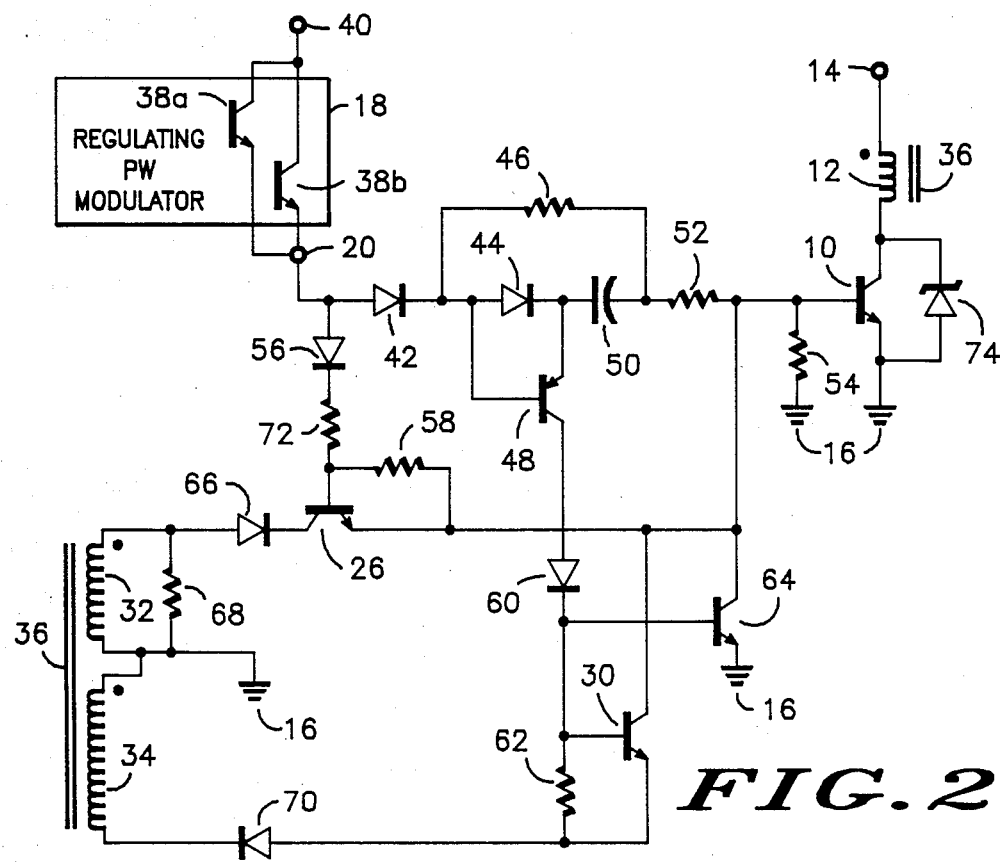
FIG. 2 shows a detailed schematic of the preferred embodiment of the present invention.

In FIG. 2 a schematic diagram of the preferred embodiment of the present invention shows a terminal 40 which is adapted to receive a first positive voltage with respect to ground terminal 16. Terminal 40 connects to collector inputs of regulating pulsewidth modulator 18.

Emitter outputs of pulsewidth modulator 18 connect together, to node 20, and to anodes of diodes 42 and 56. A cathode of diode 42 connects to a base node of a PNP transistor 48, a first node of a resistor 46, and an anode of a diode 44. A cathode of diode 44 connects to an emitter node of transistor 48 and to a first terminal of a capacitor 50. A second terminal of capacitor 50 connects to a second node of resistor 46 and a first node of a resistor 52. A second node of resistor 52 connects to a base node of an NPN transistor 10, which represents switching device 10 from FIG. 1, a collector node of an NPN transistor 64, a collector node of an NPN transistor 30, a first node of a resistor 54, an emitter node of an NPN transistor 26, and a first node of a resistor 58. A second node of resistor 54 connects to ground 16. An emitter node of transistor 10 connects to ground 16 and to an anode of a Zener diode 74. A collector node of transistor 10 connects to a cathode of Zener diode 74 and to a first terminal of a primary winding 12 of a transformer 36. Zener diode 74 operates to protect transistor 10 from large voltage spikes produced at primary winding 12. A second node of primary winding 12 of transformer 36 connects to terminal 14. Primary winding 12 of transformer 36 represents inductor 12 as described above in FIG. 1.

A cathode of diode 56 connects to a first node of a resistor 72, and a second node of resistor 72 connects to a base node of transistor 26 and a second node of resistor 58. The collector node of transistor 26 connects to a cathode of diode 66, and an anode of diode 66 connects to a first terminal of a secondary winding 32 of transformer 36 and to a first node of a resistor 68. A second node of secondary winding 32 of transformer 36 connects to a second node of resistor 68, a first node of secondary winding 34 of transformer 36, and to ground 16. A second node of secondary winding 34 of transformer 36 connects to a cathode of a diode 70, and an anode of diode 70 connects to a first node of a resistor 62 and an emitter node of transistor 30. A second node of resistor 62 connects to a base node of transistor 30, a base node of transistor 64, and a cathode of diode 60. An anode of diode 60 connects to a collector of transistor 48. Finally, an emitter of transistor 64 connects to ground 16.

Figure 3:
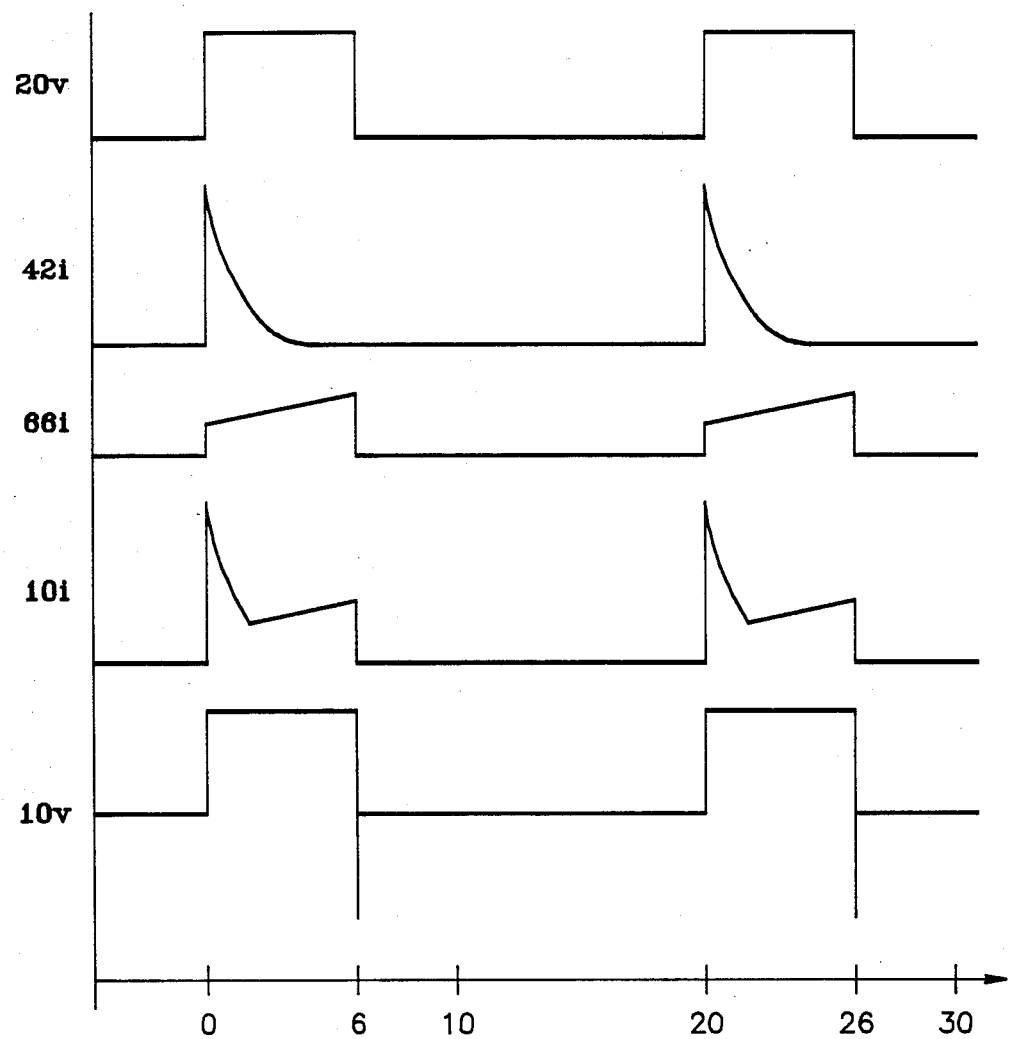
FIG. 3 shows a timing diagram of representative signals from the circuit described by FIG. 2.

The traces shown in FIG. 3 represent signals present in various sections of the FIG. 2 circuit. For example, trace 20v of FIG. 3 represents the voltage of the control signal which pulsewidth modulator 18 provides at its output, as discussed above in connection with FIG. 1. In the preferred embodiment signal 20v represents a 50 KHz signal which varies in duty cycle in response to feedback received at a sensing input (not shown) of pulsewidth modulator 18. Pulsewidth modulator 18 provides a positive voltage at node 20 when the command signal exhibits the active state, as shown at time periods 0–6 and 20–26 in FIG. 3. The instant the control signal exhibits the active state, capacitor 50 does not contain a charge, and therefore appears as a short circuit in a current path which includes diodes 42, 44, capacitor 50, resistor 52, and a base-emitter junction of transistor 10. Accordingly, the instant the command signal activates, a relatively high activating peak current pulse flows into the base of transistor 10. This activating peak current pulse is limited by the voltage across the base-emitter of transistor 10. Initially, this voltage represents the voltage applied at terminal 40, adjusted for voltage drops inherent in pulsewidth modulator 18, diodes 42 and 44, and a voltage drop across the value of resistor 52. However, as capacitor 50 charges, this voltage is reduced by the charge on capacitor 50.

As the control signal remains active, capacitor 50 charges and increases in voltage. Since capacitor 50 increases in voltage the current flowing from pulsewidth modulator 18 into the base of transistor 10 decreases. Accordingly, trace 42i of FIG. 3 represents the current flow of the control signal into the base of transistor 10.

As the control signal remains active, PNP transistor 48 remains in an inactive state because diode 44 is forward biased, causing the base of transistor 48 to experience a higher voltage than the emitter of transistor 48. Thus, no current flows through diode 60 or resistor 62, and transistors 30 and 64 are held in an off, or inactive state.

While the control signal remains active, a relatively small portion of the control signal current flows through diode 56 and resistor 72 into the base of NPN transistor 26. Since the emitter of transistor 26 couples to the base of transistor 10, the return path for this portion of the control signal current also supplies the base of transistor 10. This current flowing into the base of transistor 26 causes transistor 26 to activate. Thus, in a manner described above in connection with switch 26 of FIG. 1, secondary winding 32 of transformer 36 couples to the base of transistor 10 when the control signal is activated.

In the preferred embodiment, secondary winding 32 represents power source 32 and supplies steady state current at a relatively low voltage while the control signal remains active. Secondary winding 32 inductively couples to primary winding 12, both of transformer 36. Thus, the activation of transistor 10 causes current to flow in primary winding 12, and the current flowing in primary winding 12 inductively causes a current to flow in secondary winding 32. Secondary winding 32 is connected to that a positive node couples to transistor 26 through diode 66.

Trace 66i of FIG. 3 shows the current flowing through diode 66. Current 66i initially flows at a relatively low level due to the nature of transformer 36 which tends to resist changes in current flow. However, current flow through diode 66 increases while the control signal remains active.

The sum of current supplied by pulsewidth modulator 18, and a secondary winding 32 of transformer 36, as shown in traces 42i, and 66i of FIG. 3, respectively, represent the total current supplied to the base of transistor 10, as shown in trace 10i of FIG. 3. As shown in trace 10i an activating peak current pulse results from the portion of current supplied by pulsewidth modulator 18, and steady state current results from current supplied by secondary winding 32 of transformer 36.

When the control signal at node 20 inactivates, current flow into the base of transistor 10 immediately ceases due to inactivation of transistor 26. Resistor 68 is supplied across the nodes of secondary winding 32 to protect transistor 26 from voltage spikes which may occur as a result of instantaneously stopping current flow through secondary winding 32 of transformer 36.

At the instant the control signal inactivates, current also ceases to flow through diode 44, and transistor 48 becomes activated because the emitter node of PNP transistor 48 now experiences a higher voltage level than the base node of transistor 48 due to a stored charge within capacitor 50. When transistor 48 activates, current flows through diode 60 and resistor 62 to a negative potential at secondary winding 34 of transformer 36. Secondary winding 34 of transformer 36 represents a storage device which continues to provide current even after the inactivation of the control signal. Thus, transistor 30, which operates as switch 30 shown in FIG. 1, activates causing a negative potential which lingers across secondary winding 34 to be applied to the base of transistor 10. Trace 10v, shown in FIG. 3, represents the voltage level of the signal applied at the base of transistor 10. As shown in trace 10v, this negative voltage rapidly disappears because it results from a stored energy within transformer 36 which rapidly dissipates after transistor 10 inactivates.

After the negative voltage supplied by secondary winding 34 of transformer 36 disappears, current may still flow through diode 60. However, the current path from diode 60 now flows through the base-emitter junction of transistor 64, causing transistor 64 to exhibit an active state. While transistor 64 remains in the active state the base node of transistor 10 is coupled to ground 16. This prevents transistor 10 from self-activating as a result of stored charges within transistor 10.

Finally, the stored charge within capacitor 50 dissipates, and no more current flows through transistor 48 and diode 60. At this point, both transistors 30 and 64 exhibit an inactive state and transistor 10 may be commanded to again activate when the control signal next activates.

In summary, an activating peak current pulse supplied from pulsewidth modulator 18 initially activates transistor 10. However, a steady state current which drives transistor 10 a majority of the time transistor 10 is active originates from secondary winding 32 of transformer 36. Secondary winding 32 couples to primary winding 12. Thus, as current load increases through primary winding 12, current drive increases through secondary winding 32. Resultingly, steady state current drive remains at a level which keeps transistor 10 in saturation, but is no more than needed to drive transistor 10. Further, since secondary winding 32 represents a low voltage source compared to pulsewidth modulator 18, steady state current flowing from secondary winding 32 to ground through transistor 10 experiences a relatively low power dissipation. Finally, when the control signal inactivates, a negative voltage pulse is applied to the base of transistor 10 from secondary winding 34. This negative voltage pulse rapidly disappears due to the operation of transformer 36.

Table 1 below lists typical component values and specifications for the circuit shown in FIG. 2.

TABLE 1

| Component | Value |
|---|---|
| Modulator 18 | SG 1524, Manufactured by Silicon General |
| Resistor 46 | 12.1K |
| Resistor 52 | 51.1 Ohms |
| Resistor 54 | 1K |
| Resistor 72 | 1.96K |
| Resistor 58 | 1K |
| Resistor 62 | 1K |
| Resistor 68 | 1K |
| Capacitor 50 | 0.015 Microfarads |
| Transistor 10 | 2N5237 |
| Transistor 26 | 2N2222A |
| Transistor 30 | 2N2222A |
| Transistor 48 | 2N2907A |

TABLE 1-continued

| Component | Value |
|---|---|
| Transistor 64 | 2N2222A |
| Diode 74 | 91 Volts |
| Winding 32 of Transformer 36 | 15:1 turns ratio |

The foregoing description uses a preferred embodiment to illustrate the present invention. However, those skilled in the art will recognize that changes and modifications may be made in this embodiment without departing from the scope of the present invention. For example, one of ordinary skill in the art would recognize that the particular components listed above in Table 1 may be changed to achieve particular application specific requirements. Furthermore, the NPN and PNP transistor types are interchangeable within the scope of the present invention in a manner known to those skilled in the art. Additionally, other types of semiconductor switching devices may be employed in the present invention, such as Darlington configuration power transistors, and FET transistors. These and other modifications obvious to those skilled in the art are intended to be included within the scope of this invention.

What is claimed is:

1. A control node driving circuit for driving a control node of an output switching device, the control node driving circuit receiving a control signal which exhibits an active state wherein the control signal commands activation of the output switching device and current flows at a first voltage relative to a common potential, the control node driving circuit comprising:

a terminal adapted to receive the control signal;

means, coupled to said terminal, for initiating activation of the switching device utilizing control signal current;

means, coupled between said terminal and the control node of the output switching device for retarding control signal current flow while the control signal remains active;

a current source for providing a steady state current at a second voltage being less than the first voltage; and means, coupled to said current source and to the control node of the output switching device, for driving the control node of the output switching device utilizing current from said current source.

2. A control node driving circuit as claimed in claim 1 wherein said current source comprises a transformer having a first winding coupled to the output switching device and a second winding coupled to said driving means.

3. A control node driving circuit as claimed in claim 2 additionally comprising a second switching device coupled in series between said driving means and said control node of said output switching device, said second switching device additionally having a control node coupled to said terminal, said second switching device being for stopping flow of current between the second winding of said transformer and the control node of said output switching device when the control signal does not exhibit the active state.

4. A control node driving circuit as claimed in claim 1 wherein said retarding means comprises a capacitor in series with a resistor, said capacitor and resistor being coupled between said terminal and the control node of the output switching device.

5. A control node driving circuit as claimed in claim 1 additionally comprising:
   a voltage source for supplying a third voltage relative to the common potential, the third voltage exhibiting an opposite polarity from the first voltage; and
   a second switching device coupled in series between said voltage source and the control node of the output switching device, said second switching device being configured to apply the third voltage to the control node of the output switching device when the control signal does not exhibit the active state.

6. A control node driving circuit as claimed in claim 5 additionally comprising means, coupled to said second switching device, for removing the third voltage applied to the control node of the output switching device before the control signal exhibits the active state.

7. A control node driving circuit as claimed in claim 5 wherein said voltage source comprises a transformer having a first winding coupled to the output switching device and a second winding coupled to said second switching device.

8. A control node driving circuit as claimed in claim 7 additionally comprising:
   a second terminal adapted to receive the common potential; and
   a third switching device coupled in series between said second terminal and the control node of said output switching device, said third switching device being configured to apply the common potential to the control node of the output switching device when the control signal exhibits the inactive state.

9. A control node switching device in claim 8 additionally comprising means, coupled between said terminal and said third switching device, for removing the common potential from the control node of the output switching device before the control signal exhibits the active state.

10. A method of driving a control node of an output switching device which is commanded to activate upon activation of a control signal, the control signal having a current at a first voltage relative to a common potential associated therewith, and the output switching device being commanded to inactivate upon inactivation of the control signal, the method comprising the steps of:
    initially activating the output switching device by utilizing current of the control signal;
    reducing current flow of the control signal after said initially activating step but before inactivation of the control signal; and
    supplying a steady state current between a current source and the output switching device, said current source supplying the steady state current at a second voltage relative to the common potential wherein the second voltage exhibits the polarity of the first voltage and is less than the first voltage.

11. A method as claimed in claim 10 additionally comprising the steps of:
    stopping steady state current flow between the current source and the output switching device;
    stopping current flow of the control signal; and
    applying a third voltage relative to the common potential to the output switching device, the third voltage exhibiting a polarity opposite of the polarity exhibited by the first and second voltages, said stopping steps and said applying step being for inactivating the output switching device.

12. A method as claimed in claim 11 additionally comprising the steps of:
    removing the third voltage from the output switching device a predetermined time after the occurrence of said applying step; and
    coupling the common potential to the output switching device after said removing step.

13. A method as claimed in claim 12 additionally comprising the step of decoupling the common potential from the output switching device after said coupling step.

14. A driving circuit for a base node of a switching transistor, the driving circuit receiving a control signal which exhibits an active state wherein the control signal commands activation of the switching transistor and exhibits a first voltage relative to a common potential, the driving circuit comprising:
    a terminal adapted to receive the control signal;
    a capacitor;
    a resistor coupled in series with said capacitor, said resistor and capacitor being coupled between said terminal and the base node of the switching transistor;
    a transformer having a primary winding and first and second secondary windings, said transformer primary winding being coupled to the switching transistor, said transformer first secondary winding being arranged so that the first secondary winding provides a second voltage, relative to the common potential, having the same polarity as the first voltage and being less than the first voltage, said transformer second secondary winding being arranged so that the second secondary winding provides a third voltage, relative to the common potential, being of an opposite polarity of the first and second voltages;
    a first switch coupled between said transformer first secondary winding and the base node of said switching transistor for applying the second voltage to the base of said switching transistor when the control signal exhibits the active state; and
    a second switch coupled between said transformer second secondary winding and the base node of said switching transistor for applying the third voltage to the base of said switching transistor when the control signal does not exhibit the active state.

* * * * *